Sept. 21, 1954 G. D. HULST 2,689,913

MEANS FOR STABILIZING OSCILLATOR CIRCUIT

Filed Jan. 18, 1949

INVENTOR.
George D. Hulst

BY Darby & Darby

ATTORNEYS

Patented Sept. 21, 1954 2,689,913

UNITED STATES PATENT OFFICE 2,689,913

MEANS FOR STABILIZING OSCILLATOR CIRCUIT

George D. Hulst, Upper Montclair, N. J., assignor to Allen B. Du Mont Laboratories, Inc., Passaic, N. J., a corporation of Delaware Application January 18, 1949, Serial No. 71,528

8 Claims. (Cl. 250—36)

This invention relates to electronic oscillating circuits and particularly to frequency stabilization under conditions of varying supply voltages.

It is customary to obtain power for operation of television receivers from the ordinary house lighting supply. The voltage of such supply is usually not constant, ranging in value from 105 to 135 volts in extreme cases, with instantaneous changes of several volts due to transients introduced by power load variations. This results in variations in the plate supply voltages unless the receiver is equipped with regulated power supplies or with a special form of line voltage regulator. Such regulators or regulated power supplies are expensive.

There are several circuits in common use in television receivers whose operation is adversely affected by changes in the plate supply potential. The scanning generators particularly may be affected and produce highly undesirable effects on the picture, such as vertical "barrel-rolling" and horizontal tear-out which are irritating to the observer. These scanning generators usually take the form of impulse generators comprising multivibrators or blocking tube oscillators. While these circuits usually run in a "locked-in" relation to the synchronizing pulses by virtue of their natural period of oscillation being nearly identical to that of the synchronizing pulses, if their natural period of oscillation shifts too far from the correct frequency, the effects mentioned result.

Consequently, the object of this invention is to provide means for stabilizing the frequency of an oscillator or impulse generator against changes in the value of the applied plate potential.

Figure 1:
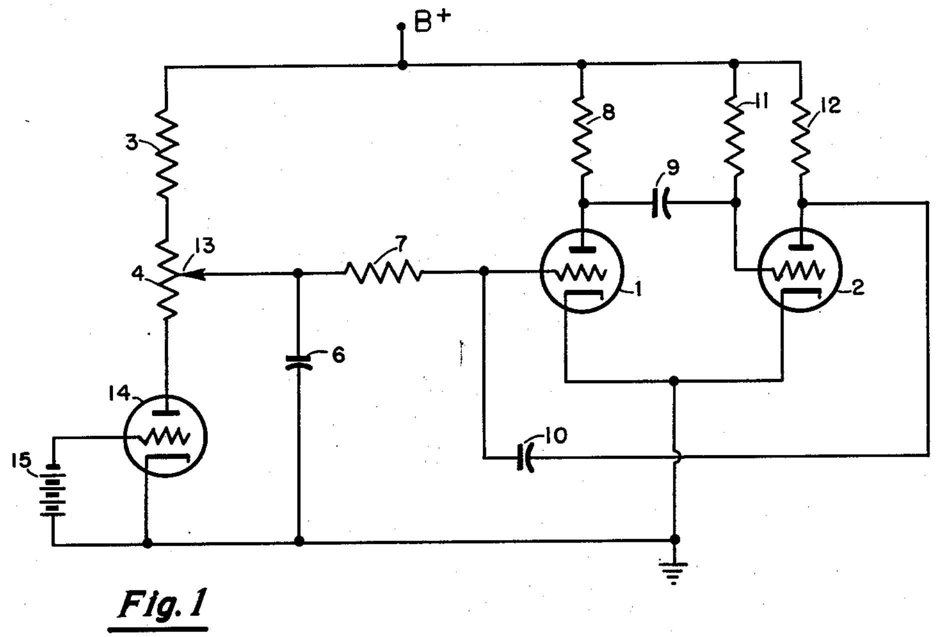
Figure 2:
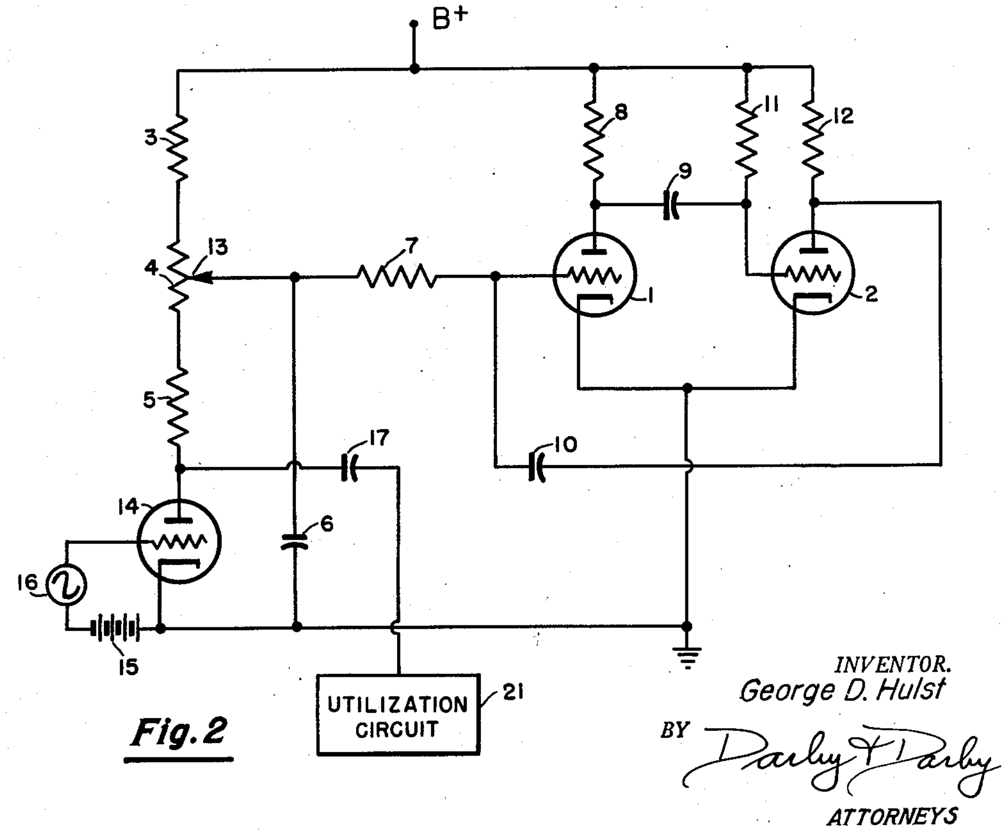

The invention may be understood from the description in connection with the attached drawings, in which:

Figure 1 is a diagram of a multivibrator circuit modified in accordance with the invention; and Figure 2 is a circuit diagram of a modification of the invention.

In a conventional multivibrator circuit, the frequency is determined and controlled by a number of factors such as the values of the time constant resistors and capacitors, the types of tubes used, the plate resistors and the resistive elements between the cathode and other electrodes. These latter resistors are of the usual or ohmic type, having a linear relationship between the current flowing through it and the voltage across its terminals. A variable or potentiometer resistor, while not essential to the operation of the multivibrator, provides a convenient means for adjusting the frequency thereof over a limited range.

In general the frequency of oscillation will be raised when the D. C. voltage at the sliding contactor of the potentiometer is raised.

Also, as the plate supply voltage, or B+ in the conventional multivibrator circuit is changed, the frequency of oscillation will be changed due to the non-linear nature of the oscillator tubes. The direction of change in general is that the frequency is increased when the plate supply voltage is increased.

In the improved circuit shown in Figure 1, an electronic tube 14 suitably biased by a battery 15 is connected in the grid circuit of one of the multivibrator tubes, as between the grid and cathode of tube 1. The voltage across the tube will change less than the current flowing through the tube due to the non-linear nature of the tube, while by comparison, in accordance with Ohm's law the voltage and current in the resistor 3 between grid and plate supply are proportional. Since the current through the grid resistor 7 is small, substantially the same amount of current flows through the series combination of the tube 14 and the resistor 3. Accordingly the voltage at the plate of the tube 14 will change less with variations of plate supply voltage than in the conventional circuit.

In my invention this departure from proportionality can be made to stabilize the frequency of a multivibrator which otherwise would have a frequency change with change of plate supply voltage.

In a representative stabilized multivibrator of the type shown in Figure 1, designed to be stabilized at a frequency of 15750 cycles per second, values for the components shown are as follows:

Tubes 1 and 2 are a 6SN7GT twin triode
Tube 14 is one half of a 6SL7GT twin triode
Resistor 3 is 500,000 ohms
Potentiometer 4 is 100,000 ohms
Resistor 7 is 3,900,00 ohms
Resistor 8 is 22,000 ohms
Resistor 11 is 390,000 ohms
Resistor 12 is 10,000 ohms
Capacitor 6 is .02 microfarad
Capacitor 9 is .00004 microfarad
Capacitor 10 is .00002 microfarad
Bias voltage 15 is 3 volts
The plate supply voltage or B+ is 200 volts If the grid filter condenser 6 be omitted from the preferred circuit shown in Figure 1, the time constant resistor 7 will be effectively increased by the supply voltage resistor, to which is added the portion of the potentiometer 4 above the slider 13, both of these latter elements being in parallel with the series combination of the tube 14 and the portion of the potentiometer 4 below the slider 13. The tube 14 therefore affects the frequency of the multivibrator in two ways which tend to oppose one another as follows: A lower effective resistance of the tube 14 lowers the potential of the slider 13, tending to slow down the oscillations. But also a lower effective resistance of the tube lowers the resistance effectively in series with the time constant resistance 7, tending to raise the frequency. Because of the opposing effect of these controlling tendencies, the by-pass condenser 6 is used in the preferred form. It should be understood, however, that the invention is operable if the condenser 6 is omitted, and the values of the resistors 3 and 7 are appropriately reselected.

Since the control tube 14 is being used to cause a preferred relationship between the direct current flowing through it and the voltage on its terminals, it is quite possible that alternating currents may be applied to this tube simultaneously, the condenser 6 acting to filter out alternating currents so that they do not cause the multivibrator to be locked-in.

Such a circuit is shown in Figure 2. This circuit is similar to that of Figure 1 except that a source 16 of alternating current is connected in the grid circuit of the tube 14, and also a condenser 17 is provided for coupling the amplified signal to a utilization circuit 21. The coupling condenser 17 blocks any direct current flowing in the utilization circuit from affecting the direct current flowing through the potentiometer 4. A fixed resistance 5 is preferably placed between the tube 14 and the potentiometer 4 to prevent the amplified signal from being bypassed by the condenser 6 in the extreme position of the potentiometer.

The tube 14 may thus serve two functions simultaneously, first to stabilize the multivibrator and second as an amplifier of signals which need not be related to the action of the multivibrator, since the two functions are independent of one another.

Although the second use for the tube 14 which has been described has been that of amplification, it will be obvious to those skilled in the art that the tube may also be used in other well known ways, such as the rectification or clipping of signals, particularly if the signals are small, in the order of five volts or less so that the direct current flowing through the tube will not be affected.

On the other hand, if a large alternating signal, in the order of 50 peak to peak volts or more, be applied to the tube 14, the bias conditions on the tube will be affected, and the frequency of the multivibrator will be controlled by the magnitude of the applied signal, which might be useful for certain applications in the art, such as automatic frequency control circuits.

It should be understood that although a triode has been shown as a regulator tube, diodes and multigrid tubes may be used, it being characteristic of the usual space-charge-limited tubes commercially available that the current flowing from the cathode is approximately proportional to the 3/2 power of the voltage or voltages applied between the cathode and other electrodes.

While the preferred form of my invention has been a multivibrator with stabilization means in the time constant circuit, other oscillators may be so stabilized, providing only that their frequency is determined in part by a resistor. Oscillators particularly adapted to this means of stabilization, are of the impulse type such as the blocking tube oscillator familiar to the television industry, and the phantastron oscillator.

While the foregoing description of my invention has been confined to the elimination of frequency variations caused by variations in plate supply voltages, it is found in practice that heater voltage variations also effect frequency although in the space-charge-limited tubes in general use, this effect is usually small. It will be evident to those skilled in the art that the means described to stabilize the oscillator against changes in plate supply voltage can, by a slight change in the values of components chosen, be used to stabilize the frequency of the oscillator against the effects of both plate and heater supply voltages, provided the two sources vary together.

Other variations and embodiments of my invention will be apparent from the following claims.

What is claimed is:

1. An electrical circuit comprising a constant frequency impulse generator containing a thermionic tube having a grid and a cathode and operative from a source of direct voltage subject to fluctuations, said generator also containing a frequency determining network connected to said grid of said tube, a linear resistive element directly connected between said grid and a positive terminal of said source, and a continuously conducting non-linear resistive element connected between said grid and said cathode.

2. An electrical circuit comprising a constant frequency impulse generator operative from a source of direct voltage subject to fluctuations, said generator comprising a multivibrator containing a thermionic tube having a grid and a cathode, said grid being connected to a frequency determining circuit, a linear resistive element connecting said grid directly to a positive terminal of said source and a continuously conducting non-linear resistive element connected between said grid and said cathode.

3. An electrical circuit comprising a constant frequency impulse generator containing a first thermionic tube having a grid and a cathode and operative from a source of direct voltage subject to fluctuations, said generator also containing a frequency determining network connected to said grid of said tube, a continuously conducting second thermionic tube connected between said grid and said cathode, and a linear resistive element directly connected between said grid and a positive terminal of said source.

4. An impulse generating circuit comprising a first thermionic tube deriving power from a source of direct current and connected to generate oscillations at fixed frequency, the grid of said tube being connected by a resistor connected in turn to a positive terminal of said source, a second thermionic tube connected between the grid and the cathode of said first tube, said second tube having a bias voltage applied thereto to cause said tube to operate within a linear portion of its characteristic curve, a signal source coupled to an input electrode of said second tube, and a utilization circuit coupled to an output electrode of said second tube.

5. An impulse generating circuit comprising a first thermionic tube deriving power from a source of direct current and connected to generate oscillations at fixed frequency, the grid of said tube being connected to a resistor connected in turn to a positive terminal of said source, a second thermionic tube connected between the grid and the cathode of said first tube, said second tube having a bias voltage applied thereto to operate as a detector, a signal source coupled to an input electrode of said second tube, and a utilization circuit coupled to said tube.

6. An electrical circuit comprising a constant frequency impulse generator containing a thermionic tube having a grid and a cathode and operative from a source of direct voltage subject to fluctuations, said circuit also containing a frequency-determining network connected to said grid, said network comprising an impedance element having a terminal connected to said grid, a linear resistive element connected between another terminal of said element and said source of direct voltage, and a continuously conducting non-linear resistive element connected between said impedance element and said cathode.

7. The circuit in accordance with claim 6, including a filter condenser connected between said impedance element and said cathode.

8. An electrical circuit comprising a constant frequency impulse generator containing a thermionic tube having a grid and a cathode and operative from a source of direct voltage subject to fluctuations, said circuit also containing a frequency-determining network connected to said grid, said network comprising an impedance element having a terminal connected to said grid, a potentiometer having an adjustable tap, said tap being connected to another terminal of said impedance element, a linear resistive element connected between an end of said potentiometer and said source of direct voltage, and a continuously conducting non-linear resistive element connected between the other end of said potentiometer and said cathode.

References Cited in the file of this patent

UNITED STATES PATENTS

| Number | Name | Date |
|---|---|---|
| 2,120,823 | White | June 14, 1938 |
| 2,153,217 | Van Der Mark | Apr. 4, 1939 |
| 2,194,529 | Shepard | Mar. 26, 1940 |
| 2,217,401 | Geiger | Oct. 8, 1940 |
| 2,250,686 | Urtel | July 29, 1941 |
| 2,389,992 | Mayle | Nov. 27, 1945 |
| 2,395,368 | Bull | Feb. 19, 1946 |
| 2,416,292 | Dodington | Feb. 25, 1947 |
| 2,426,256 | Zenor | Aug. 26, 1947 |
| 2,431,306 | Chatterjea | Nov. 25, 1947 |
| 2,449,923 | Anderson | Sept. 21, 1948 |
| 2,468,420 | Wendt | Apr. 26, 1949 |
| 2,480,418 | Paradise et al. | Aug. 30, 1949 |
| 2,513,354 | Parker | July 4, 1950 |
| 2,554,469 | Minzner | May 22, 1951 |
| 2,558,108 | Smith | June 26, 1951 |
| 2,568,533 | Artzt | Sept. 18, 1951 |